US008107479B2

(12) United States Patent
Bellovin et al.

(10) Patent No.: US 8,107,479 B2
(45) Date of Patent: *Jan. 31, 2012

(54) METHOD AND SYSTEM FOR TELEPHONY AND HIGH-SPEED DATA ACCESS ON A BROADBAND ACCESS NETWORK

(75) Inventors: Steven Michael Bellovin, Westfield, NJ (US); Joseph Henry Condon, Summit, NJ (US); Richard Vandervoort Cox, New Providence, NJ (US); Alexander Gibson Fraser, Bernardsville, NJ (US); Charles Robert Kalmanek, Jr., Short Hills, NJ (US); Alan Edward Kaplan, Morris Township, Morris County, NJ (US); Thomas Joseph Killian, Westfield, NJ (US); William Todd Marshall, Chatham, NJ (US); Peter Z. Onufryk, Flanders, NJ (US); Kadangode K. Ramakrishnan, Berkeley Heights, NJ (US); Norman Loren Schryer, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2361 days.

This patent is subject to a terminal disclaimer.

(21) Appl. No.: 10/705,048

(22) Filed: Nov. 10, 2003

(65) Prior Publication Data

US 2005/0041797 A1    Feb. 24, 2005

Related U.S. Application Data

(63) Continuation of application No. 09/231,681, filed on Jan. 14, 1999, now Pat. No. 6,665,299.

(60) Provisional application No. 60/071,346, filed on Jan. 14, 1998.

(51) Int. Cl.
*H04L 12/28* (2006.01)
(52) U.S. Cl. .............. 370/395.2; 370/338; 370/352; 370/400; 370/386; 370/216
(58) Field of Classification Search .............. 370/345, 370/465, 395.2, 352, 400, 338, 216, 386; 398/46; 379/333
See application file for complete search history.

(56) References Cited

U.S. PATENT DOCUMENTS 5,187,706 A * 2/1993 Frankel et al. .............. 370/217
(Continued)

FOREIGN PATENT DOCUMENTS

EP        0719062        6/1996
(Continued)

OTHER PUBLICATIONS

Baack et al.; "Architecture of Broad-band Communications Systems"; 1986; IEEE; 0733-8716; pp. 542-549.*

(Continued)

*Primary Examiner* — Gary Mui
*Assistant Examiner* — Dewanda Samuel
(74) *Attorney, Agent, or Firm* — Hanley, Flight & Zimmerman, LLC

(57) ABSTRACT

A system and method for providing telephony and high-speed data access over a broadband access network, comprising a network interface unit (NIU) coupled to a backup local exchange carrier (LEC) line, the broadband access network coupled to the NIU, an intermediate point-of-presence (IPOP) coupled to the broadband access network, and at least one external access network coupled to the IPOP. The system also provides for a fail-safe mode in which the NIU supports the LEC line for lifeline services.

4 Claims, 2 Drawing Sheets

U.S. PATENT DOCUMENTS

| | | | |
|---|---|---|---|
| 5,278,889 A * | 1/1994 | Papanicolaou et al. ..... 348/14.01 |
| 5,343,240 A | 8/1994 | Yu |
| 5,473,679 A * | 12/1995 | La Porta et al. .......... 379/201.05 |
| 5,488,412 A | 1/1996 | Majeti et al. |
| 5,515,418 A * | 5/1996 | Yamaguchi et al. ....... 379/32.04 |
| 5,563,938 A * | 10/1996 | Soshea et al. ............ 379/211.01 |
| 5,668,857 A | 9/1997 | McHale |
| 5,771,279 A * | 6/1998 | Cheston et al. ............. 379/93.17 |
| 5,828,666 A * | 10/1998 | Focsaneanu et al. ......... 370/389 |
| 5,864,415 A * | 1/1999 | Williams et al. ................. 398/72 |
| 5,912,963 A * | 6/1999 | Begeja et al. ............. 379/221.01 |
| 5,943,404 A * | 8/1999 | Sansom et al. ............. 379/93.06 |
| 5,982,854 A * | 11/1999 | Ehreth .......................... 379/56.2 |
| 5,999,612 A * | 12/1999 | Dunn et al. .............. 379/212.01 |
| 6,016,311 A * | 1/2000 | Gilbert et al. .................. 370/280 |
| 6,028,860 A * | 2/2000 | Laubach et al. ......... 370/395.64 |
| 6,038,227 A * | 3/2000 | Farris et al. .................... 370/354 |
| RE36,707 E | 5/2000 | Papanicolaou et al. |
| 6,075,784 A | 6/2000 | Frankel et al. |
| 6,075,787 A | 6/2000 | Bobeck et al. |
| 6,236,653 B1 * | 5/2001 | Dalton et al. ................. 370/352 |
| 6,282,189 B1 * | 8/2001 | Eames .......................... 370/352 |
| 6,396,531 B1 | 5/2002 | Gerszberg et al. |
| 6,477,595 B1 | 11/2002 | Cohen et al. |
| 6,563,816 B1 | 5/2003 | Nodoushani et al. |
| 6,665,299 B1 | 12/2003 | Bellovin et al. |
| 7,099,707 B2 * | 8/2006 | Amin et al. ................... 455/572 |
| 7,149,553 B2 * | 12/2006 | Amin et al. ................... 455/572 |
| 7,768,997 B2 * | 8/2010 | Roden et al. .................. 370/352 |
| 2003/0133437 A1 * | 7/2003 | Richarson et al. ............ 370/352 |
| 2003/0202462 A1 * | 10/2003 | Smith et al. ................... 370/216 |

FOREIGN PATENT DOCUMENTS

EP            1933533            4/2009

OTHER PUBLICATIONS

Matt et al.; "Intergrated Broad-Band Communication using Optical Networks- Results of an Experimental Study"; 1981; IEEE; vol. COM-29, No. 6; p. 868-883.*

European Patent Office, "European Search Report," issued in connection with European Application No. EP08153336, completed on Feb. 27, 2009, (3 pages).

International Search Authority/EP, "International Search Report," issued in connection with International Application No. PCT/US99/00175, completed on Jun. 14, 1999, (3 pages).

Hernandez-Valencia, Enrique J., "Architectures for Broadband Residential IP Services Over CATV Networks," Bell Laboratories, IEEE Service Center, New York, NY, US, vol. 11, No. 1, Jan. 1, 1997, (8 pages).

Irie, K., et al., "Low-End Card for Regional PC Communication Network," Electronics & Communications in Japan, Part I—Communications, Wiley Hoboken, NJ, US, vol. 80, No. 10, Oct. 1, 1997, (8 pages).

"An Ultraboard Optical Access Network: Gigabit-to-the-Home (GTTH)," NEV Research and Development, Nippon Electric LTD., Tokyo, Japan, vol. 38, No. 4, Oct. 1, 1997, (1 page).

* cited by examiner

METHOD AND SYSTEM FOR TELEPHONY AND HIGH-SPEED DATA ACCESS ON A BROADBAND ACCESS NETWORK

PRIORITY CLAIM

This is a continuation of U.S. patent application Ser. No. 09/231,681, filed Jan. 14, 1999 now U.S. Pat. No. 6,665,299, which claimed priority of U.S. Provisional Application No. 60/071,346, filed Jan. 14, 1998, entitled "Telephony On A Broadband Network."

FIELD OF THE INVENTION

This invention relates to the field of broadband access networks, and more specifically to a method and system for telephony and high-speed data access on a broadband access network.

BACKGROUND OF THE INVENTION

Broadband access networks may provide a viable alternative to present local exchange carrier (LEC) loops in providing voice and data transmissions. Although a number of innovations have occurred concerning high-speed cable modems and radio frequency (RF) telephony equipment, these innovations do not support both data and telephony well. Furthermore, present broadband access networks such as cable systems are susceptible to network failures and power outages. During, for example, a power outage, transmission over the cable system is not possible. LEC loops have very limited bandwidths; however, the LEC loops have separate power sources and operate even during power outages providing for emergency calls or other lifeline services.

What is needed is an invention that supports data and telephony access over broadband access networks while still providing, at least, basic telephony service during power outages.

SUMMARY OF THE INVENTION

The present invention provides a network interface unit (NIU) for providing telephony and high-speed data access over a broadband access network by including a combination of a broadband telephone interface (BTI) and a cable modem. The BTI is connected to an interface to which a telecommunication instrument such as a telephone can be connected (telephone interface), and is adapted to send information arriving at this interface to the broadband access network or to a backup local exchange carrier (LEC) line. The cable modem is connected to an interface to which digital appliances such as a computer can be connected (digital interface), and is adapted to send information arriving from the digital interface to the broadband access network. The NIU includes a means for accessing a telephone line during a power outage.

The broadband access network is coupled to an intermediate point-of-presence (IPOP) that, in turn, is coupled to at least one external access network. The IPOP includes an access network termination system (ANTS), a switch coupled to the ANTS, and at least one number translation database coupled to the switch. The IPOP also includes means for separating voice and data traffic, means for switching to an external access network, and means for routing to the external access network. The separating means is coupled to the switching means and the routing means is coupled to the switching means.

DETAILED DESCRIPTION

Figure 1:
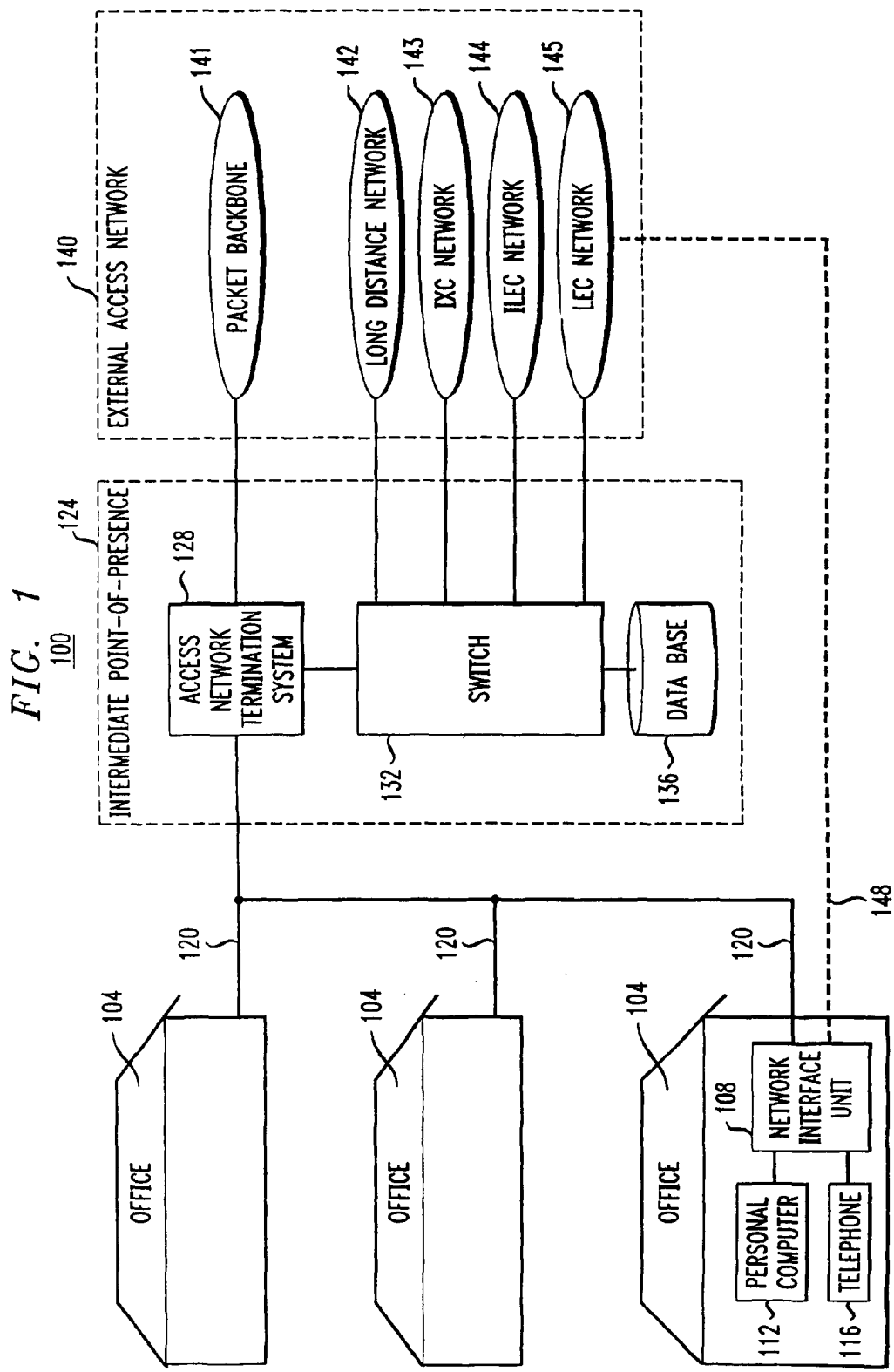
FIG. 1 illustrates a system that provides telephony and high-speed data access on a broadband access network.

FIG. 1 illustrates a system that provides telephony and high-speed data access on a broadband access network in accordance with a preferred embodiment of the present invention. The system 100 comprises offices 104, and each office contains a network interface unit (NIUs) 108 that is connected to a common broadband access network 120 and to a LEC line 148 (for sake of clarity, only one such LEC line is shown). Illustratively, within each office the NIU 108 is connected to a personal computer 112, and a telephone 116.

The broadband access network extends to an intermediate point-of-presence (IPOP) 124 that includes an access network termination system (ANTS) 128, a switch 132 connected to ANTS 128, and at least one number translation database 136 that is coupled to switch 132. IPOP 124 is also connected to at least one external access network 140. Network 140 may comprise a packet backbone 141, or an asynchronous transfer mode (ATM) backbone (not shown), that is connected to ANTS 128, and one or more of a variety of networks that are connected to switch 132, such as a long distance carrier network 142, an IXC network 143, a LEC network 145, and an incumbent local exchange carrier (ILEC) network 144.

Although one computer is shown in FIG. 1, it should be understood that a number of computers can be connected and, preferably, the computers are connected to the NIU through a local area network (LAN) such as, for example, an Ethernet. There also may be more than one telephone 116 within the office 104 that is coupled to the NIU, either directly or indirectly, and it should be understood that telephone 16 is merely illustrative of a telecommunication instrument. It could also be an of a variety of office equipment such as fax machines, and voice grade modems.

Broadband access network 120 can be implemented in a range of transport technologies such as, but not limited to, hybrid-fiber coaxial cable, mini-fiber node, and wireless technologies.

The backup LEC lines 148 connect the NIUs 108 to LEC network 145.

The general use and operation of the system 100 will now be described with reference to FIG. 1. A user accesses the broadband access network 120 by using existing personal computers 112 or telephones 116 in the office 104. The voice and/or high-speed data traffic transferred or received by these devices 112 and 116 passes through the NIU 108. The NIU 108 terminates the data-link layer protocol from the broadband access network 120 and provides services for voice, high-speed data and any combination thereof. High-speed data and telephony services share allocated bandwidth in the downstream direction as well as in the frequency agile upstream channel.

ANTS 128 performs a remote data-link layer termination at IPOP 124. Voice and high-speed data traffic flowing to and from the offices 104 pass through the ANTS 128. Upstream voice and high-speed data traffic are separated or groomed by the ANTS 128, if necessary, before being forwarded onwards. In a preferred embodiment, upstream voice traffic may be processed within the ANTS 128, which connects the voice to a circuit switched public switched telephone network (PSTN); for example, through LEC network 145. Upstream data may be processed within the ANTS 128 before being handed to a router. In another preferred embodiment, upstream voice traffic is separated and routed to, for example, the packet backbone 141. Voice traffic is separated and routed to, for example, the local exchange switch 132. In another preferred embodiment, the ANTS 128 interfaces to the local switch 132 like a conventional subscriber loop carrier (SLC) system.

System 100 acts as an LEC, providing voice service over the broadband access network 120. Calls originating from office 104 may be routed to the long distance network 142, the IXC network 143, the ILEC network 144 or the LEC network 145. Incoming long distance calls are routed to the LEC that serves the local number using the local number portability database. Several number translation databases 136 are typically needed in order to manage call routing.

If communication to the IPOP 124 over the broadband access network 120 is not possible, lifeline services are provided through LEC line 148, which couples NIU 108 directed to the LEC network.

Figure 2:
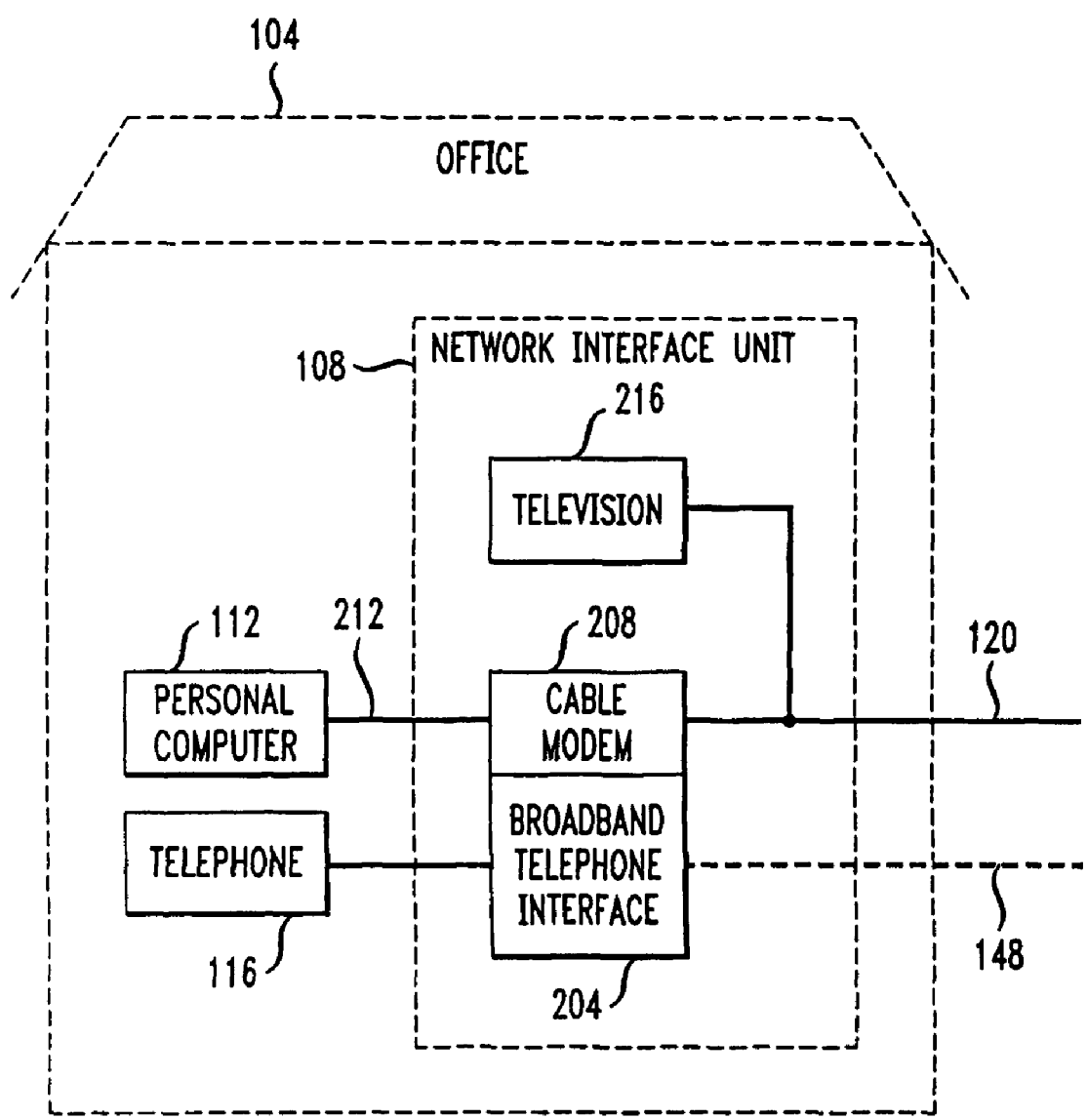
FIG. 2 illustrates an architecture of the NIU shown in FIG. 1.

FIG. 2 illustrates an office 104 that houses the NIU 108, personal computer 112 that via local area network (LAN) 212 connects to an equipment-port of cable modem 208 within NIU 108, a television 216 that connects to the network-port of cable modem 208, and telephone 116 that, for example via RJ-11 jacks, connects to broadband telephone interface (BTI) 204 within NIU 108. BTI 204 is coupled to cable modem 208.

As indicated above, LEC line 148 is coupled to NIU 108. More specifically, LEC line 148 is coupled to BTI 204.

In operation and use, the personal computers 112 through LAN 212 (e.g.

Ethernet) accesses high-speed data port in cable modem 208. Through modem 208, LAN 212 is provided, for example, internet services from broadband access network 120, while television 216 accesses voice, high-speed data, and combinations thereof directly from broadband access network 120.

In a preferred embodiment, the BTI 108 provides custom telephony services including, but not limited to, caller-identification, call waiting, tone block, return call, repeat call, call block, call forwarding, call forwarding on busy, call forwarding when no answer, anonymous call rejection, identa-ring, priority call, three-way calling and blocking. Furthermore, a wide ranging list of destinations may be dialed including, but not limited to, local calls, directory assistance, emergency calls, recorded announcements, domestic long distance calls, carrier-selected long distance calls, toll-free calls, operator services, international calls, and so-called 500/700/900 calls.

The BTI 204 supports voice packetization and a dynamic fail-safe switch to the LEC backup line 148. For the telephone ports, in the upstream direction, the BTI 204 samples the signal, performs speech compression, and performs packetization. The cable modem 208 places the packets on the cable network 120. In the downstream direction, the BTI 204 receives packets from the cable network 120 through the cable modem 208, performs jitter compensation in a playout buffer, performs decompression and plays out the samples. The BTI 204 is also responsible for dual tone multi-frequency (DTMF) generation and detection, ringing voltage generation and off-hook detection.

Transmission on the cable network 120 requires power. During power outages, the LEC line 148 is used to complete inbound and outbound telephone calls. In a preferred embodiment, the transition from the cable network 120 to the LEC line 148 is performed automatically and transparently with almost imperceptible performance differences. In some embodiments, calls in progress at the time of a power loss are dropped, and the user must redial. In other embodiments, custom calling features are not available during power outages. In another embodiment, the BTI 204 provides, for example, all PSTN features and functions, except during the fail-safe mode. In the fail-safe mode of another embodiment, the LEC backup line 148 provides basic plain old telephone service (POTS).

In a preferred embodiment, the NIU 108 provides the architecture for a migration plan by accommodating future networks by providing compatibility with the ATM backbone as well as adaptability to any new features and functions that may arise.

Although the foregoing invention has been described in terms of certain embodiments, other embodiments will become apparent to those of ordinary skill in the art in view of the disclosure herein. Accordingly, the present invention is not intended to be limited by the recitation of embodiments, but is intended to be defined solely by reference to the appended claims.

What is claimed is:

1. A network interface unit comprising:
    a broadband telephone interface to support a backup local exchange carrier line, the broadband telephone interface to transition to the backup local exchange carrier line only when communication between an intermediate point of presence and the broadband telephone interface via a broadband access network is not possible; and
    a cable modem in communication with the broadband access network to access telephony and high-speed data via the broadband access network.

2. The network interface unit of claim 1 wherein the broadband access network is to communicatively couple the broadband telephone interface to the intermediate point of presence.

3. The network interface unit of claim 1 wherein the cable modem is communicatively coupled to at least one of a television or a computer.

4. The network interface unit of claim 1 wherein the broadband telephone interface is communicatively coupled to a telephone line.

* * * * *